(12) United States Patent
Takeuchi et al.

(10) Patent No.: US 6,222,661 B1
(45) Date of Patent: Apr. 24, 2001

(54) SCANNING OPTICAL SYSTEM (75) Inventors: Shuichi Takeuchi, Saitama-ken; Junji Kamikubo, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/484,445

(22) Filed: Jan. 18, 2000

(30) Foreign Application Priority Data

Jan. 19, 1999 (JP) .................................................. 11-010545

(51) Int. Cl.⁷ .................................................. G02B 26/08
(52) U.S. Cl. ........................... 359/205; 359/570; 359/571
(58) Field of Search .................................... 359/196, 205, 359/206, 207, 216, 217, 218, 219, 569, 570, 571

(56) References Cited

U.S. PATENT DOCUMENTS

| 5,422,753 | 6/1995 | Harris | 359/216 |
| 6,067,106 * | 5/2000 | Ishibe et al. | 359/206 |
| 6,094,286 * | 7/2000 | Kato | 359/206 |

* cited by examiner

*Primary Examiner*—Darren Schuberg
(74) *Attorney, Agent, or Firm*—Greenblum & Bernstein, P.L.C.

(57) ABSTRACT

A scanning optical system is provided with a semiconductor laser, a polygonal mirror, which deflects a beam emitted from the semiconductor laser, an fθ lens for converging the beam deflected by the deflector onto a surface to be scanned, and a diffractive surface between the polygonal mirror and the surface to be scanned. The diffractive surface compensates for a lateral chromatic aberration caused by the fθ lens. Further, the diffraction efficiency of the diffractive surface on an optical axis of the fθ lens is smaller than that of a peripheral portion to cancel a power variation due to a variation of the light quantity transmitted through the scanning lens.

14 Claims, 4 Drawing Sheets

SCANNING OPTICAL SYSTEM

BACKGROUND OF THE INVENTION

The present invention relates to a scanning optical system that is used as an optical system for a scanning optical device such as a laser beam printer.

The scanning optical device deflects a beam emitted from a light source such as a semiconductor laser by means of, for example, a polygonal mirror, and converges the beam to form a spot on a surface to be scanned such as a surface of a photoconductive drum, through an fθ lens (i.e., a scanning lens). The beam spot formed on the surface to be scanned moves (i.e., scans) on the surface in a predetermined scanning direction as the polygonal mirror rotates.

In such a scanning optical system, since an optical path length and an incident angle for each of the lens surfaces are different according to a scanning angle, transmitting light quantity, i.e., the quantity of light transmitted through the fθ lens varies as the laser beam is deflected. In general, the quantity of light transmitted through the optical elements between the polygonal mirror nd the photoconductive drum along the optical axis is larger than that through the peripheral portion of the elements. The variation of the quantity of the transmitted light due to change of the scanning angle is referred to as a power variation.

If the power variation exceeds the tolerance level, an exposure on the photoconductive dram varies widely, which reduces printing quality.

SUMMARY OF THE INVENTION

It is therefore an object of the invention to provide an improved scanning optical system that is capable of reducing the power variation due to the change of the transmitted light quantity.

For the above object, according to the invention, there is provided a scanning optical system, including a light source; a deflector, which deflects a beam emitted from the light source; a scanning lens having positive refractive power for converging the beam deflected by the deflector onto a surface to be scanned; and a diffractive surface, which is located between the deflector and the surface to be scanned. The diffractive surface is designed for compensating chromatic aberration caused by the refractive power of the scanning lens, and the diffraction efficiency of the diffractive surface on an optical axis of the scanning lens is different from that of a peripheral portion to cancel a power variation due to a variation of quantity of light transmitted through the scanning lens.

The diffractive surface for compensating the chromatic aberration has been employed, particularly, in a multi-beam scanning optical system to reduce the variation of the scanning lines due to the variation of the wavelengths of the light sources. The diffractive surface is, in general, designed such that the maximum and constant diffraction efficiency is obtained in the entire area of the scanning range. On the contrary, the diffractive surface of the present invention varies the diffractive efficiency according to the scanning angle to cancel the power variation. That is, the diffraction efficiency for the axial ray is different from that for the marginal ray.

The diffractive surface may be formed on a plane parallel plate that is independent from the scanning lens, or may be formed on one surface of the scanning lens. When the diffractive surface is formed on the independent plate, it is preferable that the plate is located between the deflector and the scanning lens to minimize a size of the plate.

When the product of the ratio T of the transmitted light quantities and the ratio N of the diffractive efficiencies is the order of 1.0, the light quantity on the surface to be scanned is substantially constant in the entire area of the scanning range. The ratio T is defined as $T=Ty_1/Ty_0$, where $Ty_0$ is transmitting light quantity through the optical elements between the deflector and the surface to be scanned along the optical axis, and $Ty_1$ is transmitting light quantity through the peripheral portion of the optical elements. The ratio N is defined as $N=\eta_1/\eta_0$, where $\eta_0$ is a diffractive efficiency of the diffractive surface on the optical axis, and $\eta_1$ is a diffractive efficiency of the diffractive surface on the peripheral portion.

Preferably, the product of the ratios satisfies the following condition (1);

$$0.8 < N \times T < 1.1. \tag{1}$$

When the transmitted light quantity along the optical axis $Ty_0$ is larger than that of the peripheral portion $Ty_1$, the diffraction efficiency of the peripheral portion $\eta_1$ may be larger than that on the optical axis $\eta_0$.

The diffractive efficiency can be varied by shifting a blazed wavelength with respect to an actual wavelength in use. The larger the difference of the blazed wavelength from the actual wavelength is, the smaller the diffractive efficiency becomes. When the transmitted light quantity along the optical axis $Ty_0$ is larger than that of the peripheral portion $Ty_1$, the blazed wavelength $\lambda_1$ of the diffractive surface on the optical axis may be different from the actual wavelength $\lambda_0$ in use. When $\lambda_1$ is smaller than $\lambda_0$, the ratio $\Lambda$ of the wavelengths ($\Lambda=\lambda_1/\lambda_0$) and the ratio T of the transmitted light quantities ($T=Ty_1/Ty_0$) may satisfy the condition (2). On the other hand, when $\lambda_1$ is larger than $\lambda_0$, the ratio $\Lambda$ and the ratio T may satisfy the condition (3).

$$0.8 < \Lambda/T < 1.2 \tag{2}$$

$$0.8 < \Lambda \times T < 1.2 \tag{3}$$

According to another aspect of the invention, there is provided a scanning optical system, including a light source; a deflector, which deflects a beam emitted from the light source and is incident from outside of an effective scanning range; a scanning lens having positive refractive power for converging the beam deflected by the deflector onto a surface to be scanned; and a diffractive surface whose diffraction efficiency varies along a main scanning direction, and the variation of the diffractive efficiency being asymmetrical with respect to an optical axis of the scanning lens. The diffractive surface is located between the deflector and the surface to be scanned, for compensating chromatic aberration caused by the refractive power of the scanning lens.

When the light beam from the light source is incident on the deflector from outside of the effective scanning range, the power variation becomes asymmetrical with respect to the optical axis. Such an asymmetrical power variation can be compensated by the asymmetrical variation of the diffractive efficiency as described above.

In this case, when the light beam from the light source is incident on the deflector as S-polarized light, the diffraction efficiency of the diffractive surface at the same side of the incident beam on the deflector with respect to the optical axis may be higher than that at the other side. On the contrary, when the incident light on the deflector is P-polarized light, the diffraction efficiency of the diffractive surface at the same side of the incident beam on the deflector with respect to the optical axis may be lower than that at the other side.

It is preferable that the light beam travels to the surface to be scanned is a first order diffractive light diffracted by the diffractive surface. Still further, the light source may be a multi-beam light source for emitting a plurality of light beams, and the plurality of light beams forming a plurality of scanning lines per scan.

DETAILED DESCRIPTION OF THE PREFERRED EMBODIMENTS

An optical scanning system according to embodiments of the invention will be described with reference to the accompanying drawings.

First Embodiment

Figure 1:
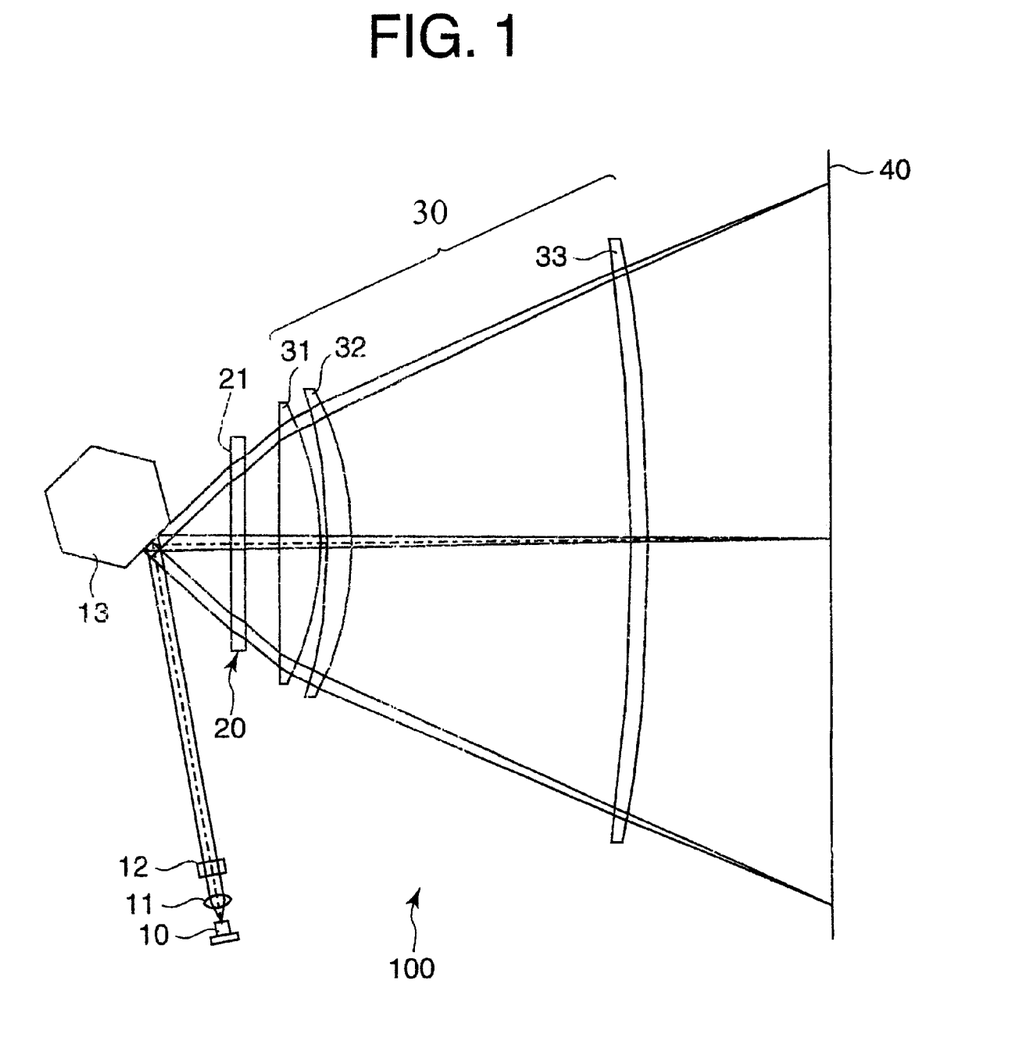
FIG. 1 is a diagram showing an arrangement of optical elements of a scanning optical system, viewed in a main scanning plane, according to first and second embodiments.

FIG. 1 is a diagram illustrating a basic construction of a scanning optical system 100 that is common for first and second embodiments, viewed in a main scanning plane.

A divergent laser beam emitted by a semiconductor laser 10 is collimated by a collimator lens 11 and is converged in an auxiliary scanning direction by a cylindrical lens 12 to be incident on a polygonal mirror (deflector) 13. The laser beam deflected by a reflection surface of the polygonal mirror 13 forms a beam spot on a surface to be scanned 40 through a diffractive element 20 and an fθ lens 30 as a scanning lens.

The beam spot scans on the surface 40 as the polygonal mirror 13 rotates.

In this specification, a direction equivalent to the scanning direction of the beam spot on the surface to be scanned 40 is referred to as a main scanning direction, a direction perpendicular to the main scanning direction is referred to as the auxiliary scanning direction. The main scanning plane is a plane formed as a locus of a central axis of the laser beam deflected by the polygonal mirror 13.

The laser beam forms a line-spread image, once converged in the auxiliary scanning direction by the cylindrical lens 12, on or near the reflecting surface of the polygonal mirror 13. The beam then again forms an image on the surface to be scanned 40, again converged by means of the optical power of the fθ lens 30 in the auxiliary scanning direction. This structure prevents displacement of the scanning beam on the surface 40 due to a facet error of the reflecting surface of the polygonal mirror 13.

The fθ lens 30 includes a first lens 31, a second lens 32 and a third lens 33, in this order along the direction from the polygonal mirror 13 to the surface to be scanned 40. The fθ lens 30 has a transmitting characteristic such that the quantity of light transmitted through the fθ lens 30 along the optical axis is larger than that through the peripheral portion of the fθ lens 30.

The diffractive element 20 is substantially a plane parallel plate whose polygonal mirror side surface is formed as a diffractive surface 21. The light beam traveling to the surface to be scanned 40 is a first order diffractive light diffracted by the diffractive surface 21. The diffractive surface 21 has a function to compensate a lateral chromatic aberration caused by the fθ lens 30. Further, the diffraction efficiency of the diffractive surface 21 on an optical axis of the fθ lens 30 is smaller than that of a peripheral portion to cancel a power variation due to a variation of the quantity of light transmitted through the scanning lens 30.

When the ratio T of the transmitted light quantities is defined as $T=Ty_1/Ty_0$, where $Ty_0$ is transmitting light quantity through the fθ lens 30 along the optical axis, and $Ty_1$ is transmitting light quantity through the peripheral portion of the fθ lens 30, the diffractive surface 21 is designed to satisfy the following condition (1):

$$0.8 < N \times T < 1.1 \tag{1}$$

The ratio N of the diffractive efficiencies is defined as $N=\eta_1/\eta_0$, where $\eta_0$ is a diffractive efficiency of the diffractive surface 21 on the optical axis, and $\eta_1$ is a diffractive efficiency of the diffractive surface 21 on the peripheral portion.

In the first embodiment, the blazed wavelength on the optical axis is shifted from the actual wavelength in use as a means of relatively increasing the diffraction efficiency of the peripheral portion $\eta_1$ and of relatively decreasing the diffraction efficiency on the optical axis $\eta_0$. Namely, since the diffractive efficiency of the diffractive surface 21 depends on not only a wavelength but also an incident angle, a change of the incident angle varies diffractive efficiency with constant wavelength. Thus, the diffractive surface is designed such that the diffractive efficiency for the vertical incident light beam (axial light beam) in the actual wavelength is smaller than that for the angled incident light beam (marginal light beam) in the actual wavelength, which compensates the power variation. Such a diffractive surface can be obtained by determining the blazed wavelength $\lambda_1$ on the optical axis as a specific value that is different from the actual wavelength $\lambda_0$ in use.

When $\lambda_1$ is smaller than $\lambda_0$, the ratio $\Lambda$ of the wavelengths ($\Lambda=\lambda_1/\lambda_0$) and the ratio T of the transmitted light quantities ($T=Ty_1/Ty_0$) may satisfy the condition (2). On the other hand, when $\lambda_1$ is larger than $\lambda_0$, the ratio $\Lambda$ and the ratio T may satisfy the condition (3).

$$0.8 < \Lambda/T < 1.2 \tag{2}$$

$$0.8 < \Lambda \times T < 1.2 \tag{3}$$

The conditions (1), (2) and (3) define the compensation effect of the power variation by the diffractive surface 21. When the conditions are satisfied, the diffractive surface 21 sufficiently compensates the power variation. On the contrary, if the conditions are not satisfied, the power variation will be undercorrected or overcorrected.

The optical function of the diffractive surface 21 is expressed by the optical path difference function $\Delta\phi(h)$ that is defined by the following equation (A).

$$\Delta\phi(h)=P2h^2+P4h^4+P6h^6+P8h^8+P10h^{10} \tag{A}$$

P2, P4, P6, P8 and P10 are coefficients of second, fourth, sixth, eighth and tenth orders, h is a height from the optical axis.

The practical shape of the diffractive surface is a discontinuous surface that is similar to a Fresnel lens. A large number of periodic patterns such as concentric rings, each of which has a wedge sectional shape, are formed on a base curve. Each of the boundaries between the adjacent rings is formed as a step giving a predetermined optical path difference. The practical shape of the diffractive surface 21 is expressed by a distribution of sag amount SAG(h). It represents a distance of the diffractive surface 21 from a tangential plane at a point on the surface where the height from the optical axis is h.

$$SAG(h)=X(h)+S(h) \quad (B)$$

In the equation (B), X(h) represents a distribution of sag amount of a rotationally symmetrical aspherical surface as a base curve of the diffractive surface 21, and S(h) represents a distribution of sag amount of diffractive structure formed on the base curve. The base curve is defined as a shape of the diffractive element 20 that does not include the diffractive lens structure. The sags X(h) and S(h) are expressed by the following equations (C) and (D), respectively.

$$X(h) = \frac{h^2}{r\left\{1+\sqrt{1-\frac{(K+1)^2h^2}{r^2}}\right\}} + A4h^2 + A6h^6 + A8h^8 + A10h^{10} \quad (C)$$

$$S(h) = \frac{\{|MOD(\Delta\phi(h)+C,-1)|-C\}\lambda_0}{n-1+B_0+B_1h+B_2h^2} \quad (D)$$

Symbol K is a conic constant, r is a radius of curvature on the optical axis, A4, A6, A8 and A10 are aspherical surface coefficients of fourth, sixth, eighth and tenth orders. Further, symbol C is a constant defining a phase at a boundary between adjacent rings ($0 \leq C < 1$), $\lambda_0$ is an actual wavelength in use, n is a refractive index of the diffractive element 20, and B0, B1 and B2 are coefficients for correcting the change of the optical path difference function due to the diagonal incidence of the light beam on the diffractive surface 21. The function MOD(x, y) represents the remainder when x is divided by y. MOD($\Delta\phi(h)$)+C, −1) is equal to zero at the boundary. In the embodiments, the constant C is equal to 0.2.

The total shape SAG(h) is obtained by applying the shape of the diffractive structure S(h) onto the shape of the base curve X(h). A number of the concentric ring N is expressed by the following equation (E).

$$N = INT\left|\frac{\phi(h)}{\lambda_0}+C\right| \quad (E)$$

The following TABLE 1 shows the lens arrangement of the scanning optical system 100 according to the first embodiment on the scanned surface side with respect to the polygonal mirror 13. In the first embodiment, the blazed wavelength $\lambda_1$ on the optical axis is smaller than the actual wavelength $\lambda_0$ in use. Namely, $\lambda_0$ is equal to 780 nm and $\lambda_1$ is equal to 646 nm.

Surface number #0 represents the reflection surface of the polygonal mirror 13, numbers #1 and #2 represent the diffractive element 20, numbers #3 and #4 represent the first lens 31, numbers #5 and #6 represent the second lens 32, numbers #7 and #8 represent third lens 33.

Symbol f in the table represents a total focal length (unit: mm) of the diffractive element 20 and the fθ lens 30 in the main scanning direction, fD is a focal length (unit: mm) of the diffractive element 20, 2ω is an angle (unit: degrees) between the light beam directed to the scanning-start point and the light beam directed to the scanning-end point, r is a radius of curvature (unit: mm) of the surfaces, d is a distance (unit: mm) between surfaces along the optical axis, n is a refractive index of the element.

TABLE 1

| | f = 144.7 | fD = 3164.6 | 2ω = 85.4° | |
|---|---|---|---|---|
| Surface Number | r | d | n | |
| #0 | ∞ | 24.00 | | |
| #1 | −1581.57 | 4.00 | 1.486 | Diffractive surface |
| #2 | ∞ | 10.00 | | |
| #3 | ∞ | 12.00 | 1.486 | |
| #4 | −100.00 | 2.00 | | |
| #5 | −170.00 | 7.00 | 1.486 | |
| #6 | −94.00 | 82.60 | | |
| #7 | −400.00 | 4.00 | 1.486 | |
| #8 | −650.00 | | | |

The diffractive surface 21 (#1) is formed by applying the diffractive structure on the rotationally symmetrical aspherical base curve. The various constants and coefficients for defining the diffractive structure and the base curve are shown in TABLE 2. The incident side surface (#6) of the third lens 33 is a rotationally symmetrical aspherical surface, the constant and the coefficients of this surface are also shown in TABLE 2. Furthermore, the exit side surface (#7) of the third lens 33 is a modified toric surface that is defined as a locus when the non-circular arc curve is rotated about a rotation axis that is perpendicular to the optical axis and is located in the main scanning plane. The non-circular arc curve is defined by the equation (C) when a sag, i.e., a distance corresponding to a point on the non-circular arc curve with respect to a tangential line at a point where the optical axis intersects the non-circular arc curve, is represented by X(h). In TABLE 2, the constant and coefficients for defining the non-circular arc curve are shown. Symbol rz is a radius of curvature in the auxiliary scanning direction. The modified toric surface (#8) is defined as a locus when the non-circular arc curve is rotated about the rotation axis that crosses the optical axis at a point rz mm away from an intersection point of the modified toric surface with the optical axis. The rotation axis is located at the surface 40 side with respect to the modified toric surface when rz has a positive value (rz>0).

It should be noted that the radius of curvature of each of the aspherical surfaces and the modified toric surface indicated in TABLE 1 is a value of each of optical elements on the optical axis.

TABLE 2

| #1 Diffractive surface | | |
|---|---|---|
| K = 0.000 | A4 = −9.749 × 10$^{-10}$ | A6 = 1.486 × 10$^{-15}$ |
| A8 = A10 = 0.000 | | |
| P2 = −2.0256 × 10$^{-1}$ | P4 = −1.3620 × 10$^{-5}$ | P6 = 1.4892 × 10$^{-9}$ |
| P8 = −2.6585 × 10$^{-16}$ | P10 = 0.0000 | |
| B0 = 1.01 × 10$^{-1}$ | B1 = 0.00 | B2 = 0.00 |
| #6 Rotationally symmetrical aspherical surface | | |
| K = 0.000 | A4 = 1.900 × 10$^{-7}$ | A6 = −8.000 × 10$^{-12}$ |
| A8 = A10 = 0.000 | | |

TABLE 2-continued

7 Modified toric surface rz = 20.60
K = 0.000      A4 = 1.000 × 10⁻⁷      A6 = −4.600 × 10⁻¹²
A8 = A10 = 0.000

According to the first embodiment, $T=0.866$, $N=1.154$ and $\Lambda=0.828$; and thus $T\times N=0.999$, $\Lambda/T=0.956$, which satisfies the conditions (1) and (2). Therefore, the diffractive surface 21 effectively compensates the power variation due to the uneven distribution of the transmittance of the scanning lens 30.

Second Embodiment

The scanning optical system according to the second embodiment is substantially the same as the first embodiment. The arrangement of the elements of the second embodiment is also shown in FIG. 1. The blazed wavelength of the diffractive surface 21, however, is different from the first embodiment.

In the second embodiment, the blazed wavelength $\lambda_1$ on the optical axis is larger than the actual wavelength $\lambda_0$ in use. Namely, $\lambda_0$ is equal to 780 nm and $\lambda_1$ is equal to 984 nm. The coefficients B0, B1 and B2 are different from the first embodiment as shown in TABLE 3, which changes the blazed wavelength. The other values are the same as the first embodiment.

TABLE 3

1 Diffractive surface

B0 = −1.01 × 10⁻¹      B1 = 0.00      B2 = 3.80 × 10⁻⁴

According to the second embodiment, $T=0.866$, $N=1.152$ and $\Lambda=1.262$, and thus $T\times N=0.997$, $(\Lambda\times T)^{-1}=0.915$, which satisfies the conditions (1) and (3). Therefore, the diffractive surface 21 effectively compensates the power variation due to the uneven distribution of the transmittance of the scanning lens 30.

Third Embodiment

Figure 2:
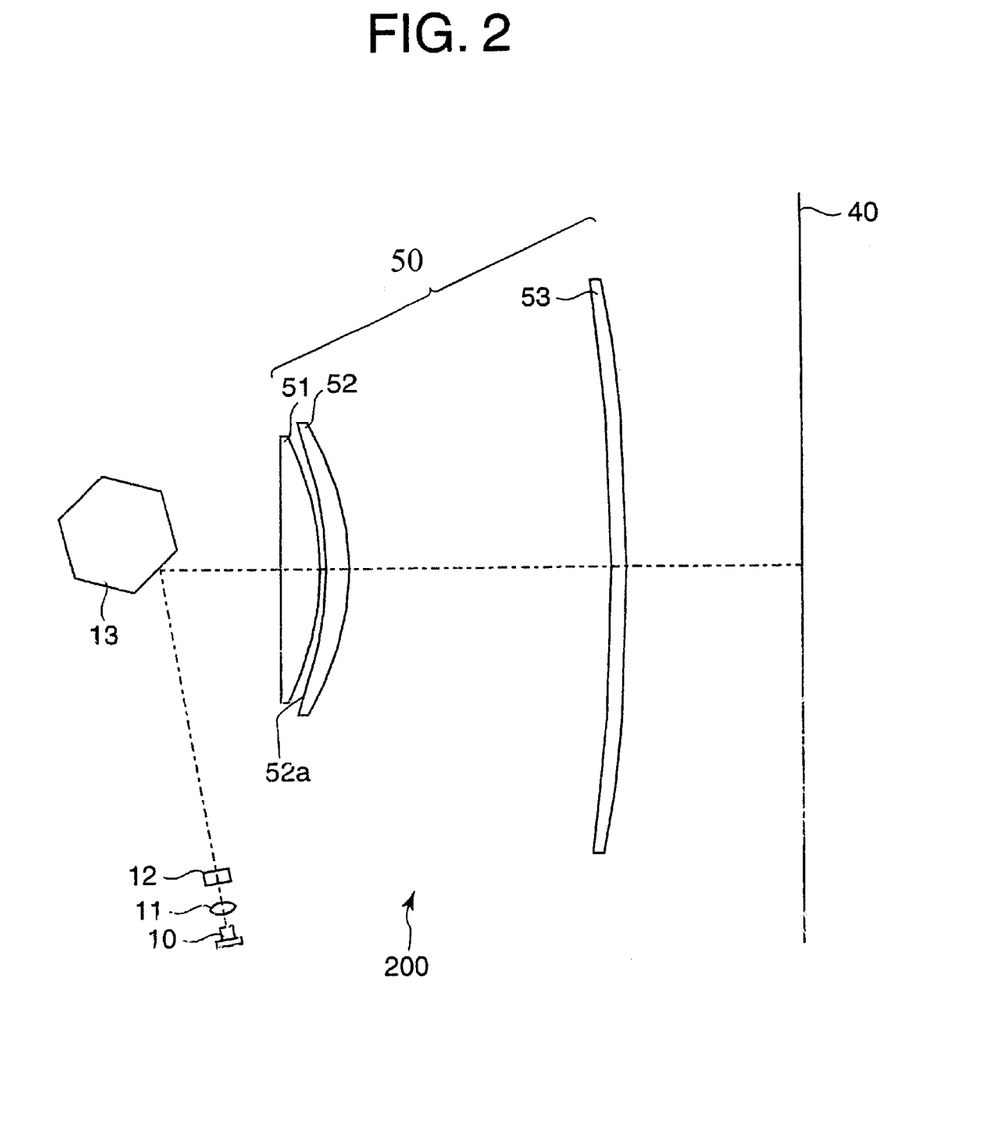
FIG. 2 is a diagram showing an arrangement of optical elements of a scanning optical system, viewed in the main scanning plane, according to third and fourth embodiments.

FIG. 2 is a diagram illustrating a basic construction of a scanning optical system 200 that is common for third and fourth embodiments, viewed in a main scanning plane.

The scanning optical system 200 includes the semiconductor laser 10, the collimator lens 11, the cylindrical lens 12 and the polygonal mirror 13 that are the same as the first embodiment. An fθ lens 50 as the scanning lens is composed of a first lens 51, a second lens 52 and a third lens 53. The incident side surface of the second lens 52 is formed as the diffractive surface 52a.

The diffractive surface 52a has a function to compensate a lateral chromatic aberration caused by the fθ lens 50. Further, the diffraction efficiency of the diffractive surface 52a on an optical axis of the fθ lens 50 is smaller than that of a peripheral portion to cancel a power variation due to a variation of the quantity of light transmitted through the scanning lens 50. In the third embodiment, the blazed wavelength $\lambda_1$ on the optical axis is smaller than the actual wavelength $\lambda_0$ in use. Namely, $\lambda_0$ is equal to 780 nm and $\lambda_1$ is equal to 682 nm.

The following TABLE 4 shows the lens arrangement of the scanning optical system 200 according to the third embodiment on the scanned surface side with respect to the polygonal mirror 13. Surface number #0 represents the reflection surface of the polygonal mirror 13, numbers #1 and #2 represent the first lens 51, numbers #3 and #4 represent the second lens 52, numbers #5 and #6 represent third lens 53.

TABLE 4 f = 144.8      fd = 4538.9      2ω = 85.4°

| Surface Number | r | d | n | |
|---|---|---|---|---|
| #0 | ∞ | 35.00 | | |
| #1 | ∞ | 12.50 | 1.486 | |
| #2 | −100.00 | 2.00 | | |
| #3 | −135.00 | 7.00 | 1.486 | Diffractive surface |
| #4 | −85.70 | 82.60 | | |
| #5 | −400.00 | 4.00 | 1.486 | |
| #6 | −620.00 | | | |

In the third embodiment, the surface #3 is the diffractive surface 52a, the surface #4 is the rotationally symmetrical aspherical surface and the surface #5 is the modified toric surface. The constants and the coefficients for defining these surfaces are shown in TABLE 5. The base curve of the diffractive surface 52a is a spherical surface.

TABLE 5

3 Diffractive surface

P2 = −1.4123 × 10⁻¹      P4 = −1.9372 × 10⁻⁶      P6 = −5.2762 × 10⁻¹¹
P8 = −2.1239 × 10⁻¹⁵      P10 = 0.00
B0 = 7.00 × 10⁻²      B1 = 0.00      B2 = −5.00 × 10⁻⁵

4 Rotationally symmetrical aspherical surface

K = 0.00      A4 = 2.000 × 10⁻⁷      A6 = 3.000 × 10⁻¹²

5 Modified toric surface rz = 20.80
K = 0.00      A4 = 1.000 × 10⁻⁷      A6 = −4.000 × 10⁻¹²

According to the third embodiment, $T=0.947$, $N=1.071$ and $\Lambda=0.874$, and thus $T\times N=1.014$, $\Lambda/T=0.923$, which satisfies the conditions (1) and (2). Therefore, the diffractive surface 52a effectively compensates the power variation due to the uneven distribution of the transmittance of the scanning lens 50.

Fourth Embodiment

The scanning optical system according to the fourth embodiment is substantially the same as the third embodiment. The arrangement of the elements of the fourth embodiment is also shown in FIG. 2. The blazed wavelength of the diffractive surface 52a, however, is different from the third embodiment.

In the fourth embodiment, the blazed wavelength $\lambda_1$ on the optical axis is larger than the actual wavelength $\lambda_0$ in use. Namely, $\lambda_0$ is equal to 780 nm and $\lambda_1$ is equal to 890 nm. The coefficients B0, B1 and B2 are different from the third embodiment as shown in TABLE 6, which changes the blazed wavelength. The other values are the same as the third embodiment.

TABLE 6

3 Diffractive surface

B0 = −6.00 × 10⁻²      B1 = 0.00      B2 = 5.50 × 10⁻⁵

According to the fourth embodiment, $T=0.947$, $N=1.051$ and $\Lambda=1.141$, and thus $T\times N=0.996$, $(\Lambda\times T)^{-1}=0.926$, which satisfies the conditions (1) and (3). Therefore, the diffractive surface 52a effectively compensates the power variation due to the uneven distribution of the transmittance of the scanning lens 50.

Fifth Embodiment

Figure 3:
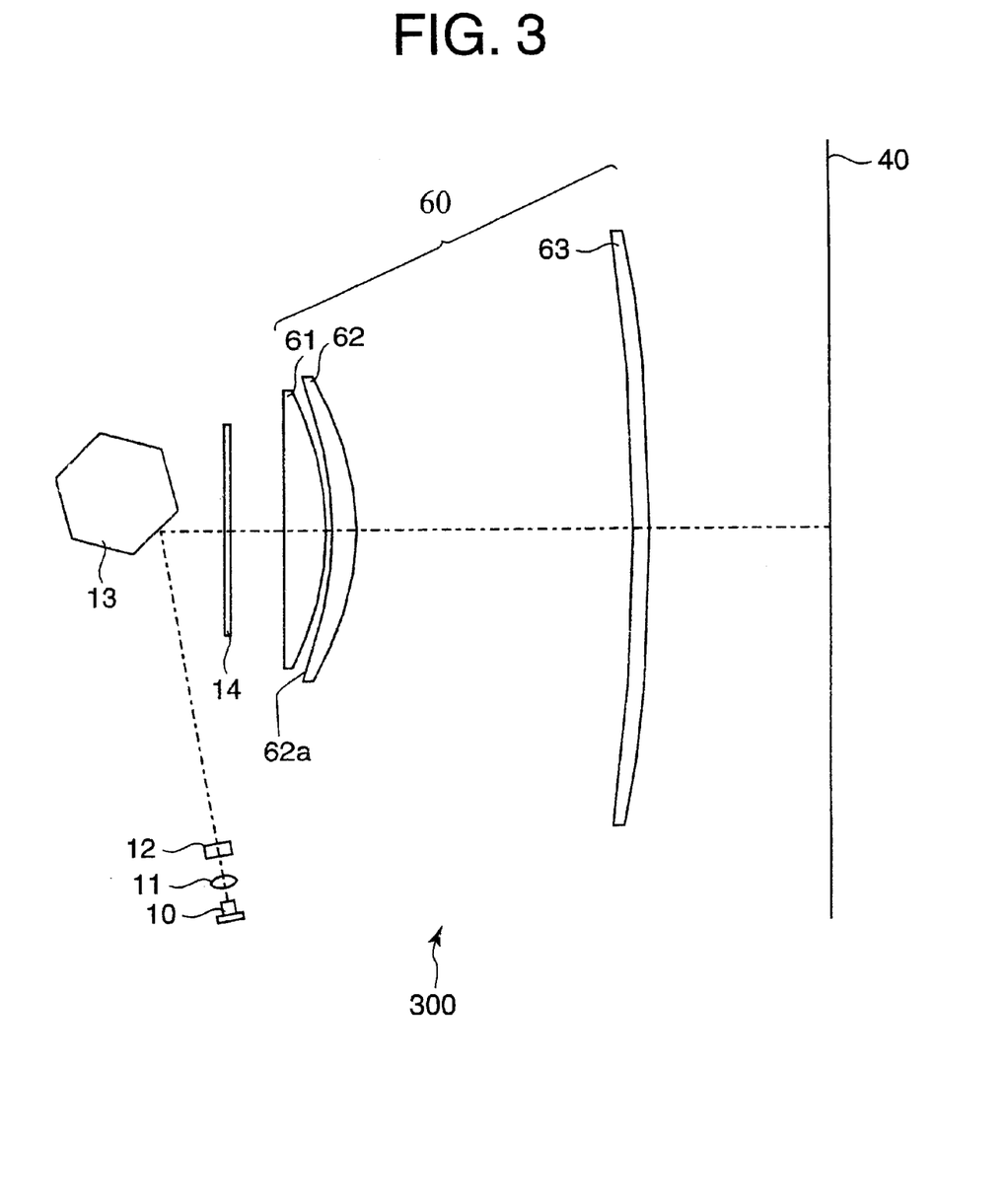
FIG. 3 is a diagram showing an arrangement of optical elements of a scanning optical system, viewed in the main scanning plane, according to fifth through seventh embodiments.

FIG. 3 is a diagram illustrating a basic construction of a scanning optical system 300 that is common for fifth through seventh embodiments, viewed in a main scanning plane.

The scanning optical system 300 includes the semiconductor laser 10, the collimator lens 11, the cylindrical lens 12 and the polygonal mirror 13 that are the same as the first embodiment. An fθ lens 60 as the scanning lens is composed of a first lens 61, a second lens 62 and a third lens 63. The incident side surface of the second lens 62 is formed as the diffractive surface 62a. Further, a cover glass plate 14 is disposed between the polygonal mirror 13 and the first lens 61.

The diffractive surface 62a has a function to compensate a lateral chromatic aberration caused by the fθ lens 50. Further, the diffraction efficiency of the diffractive surface 62a on an optical axis of the fθ lens 60 is smaller than that of a peripheral portion to cancel a power variation due to a variation of the quantity of light transmitted through the cover glass plate 14 and the scanning lens 60. In the fifth embodiment, the blazed wavelength $\lambda_1$ on the optical axis is smaller than the actual wavelength $\lambda_0$ in use. Namely, $\lambda_0$ is equal to 780 nm and $\lambda_1$ is equal to 724 nm.

The following TABLE 7 shows the lens arrangement of the scanning optical system 300 according to the fifth embodiment on the scanned surface side with respect to the polygonal mirror 13. Surface number #0 represents the reflection surface of the polygonal mirror 13, numbers #1 and #2 represent the cover glass plate, numbers #3 and #4 represent the first lens 61, numbers #5 and #6 represent the second lens 62, numbers #7 and #8 represent third lens 63.

TABLE 7 f = 144.8   fD = 4538.9   2ω = 85.4°

| Surface Number | r | d | n | |
|---|---|---|---|---|
| #0 | ∞ | 20.00 | | |
| #1 | ∞ | 2.00 | 1.486 | |
| #2 | ∞ | 13.70 | | |
| #3 | ∞ | 12.50 | 1.486 | |
| #4 | −100.00 | 2.00 | | |
| #5 | −135.00 | 7.00 | 1.486 | Diffractive surface |
| #6 | −85.70 | 82.60 | | |
| #7 | −400.00 | 4.00 | 1.486 | |
| #8 | −620.00 | | | |

In the fifth embodiment, the surface #5 is the diffractive surface 62a, the surface #6 is the rotationally symmetrical aspherical surface and the surface #7 is the modified toric surface. The constants and the coefficients for defining these surfaces are shown in TABLE 8. The base curve of the diffractive surface 62a is a spherical surface.

TABLE 8

5 Diffractive surface

| | | |
|---|---|---|
| $P2 = -1.4123 \times 10^{-1}$ | $P4 = -1.9372 \times 10^6$ | $P6 = -5.2762 \times 10^{11}$ |
| $P8 = -2.1239 \times 10^{-15}$ | $P10 = 0.00$ | |
| $B0 = 3.80 \times 10^{-2}$ | $B1 = 0.00$ | $B2 = -2.60 \times 10^{-5}$ |

6 Rotationally symmetrical aspherical surface

| | | |
|---|---|---|
| K = 0.00 | $A4 = 2.000 \times 10^{-7}$ | $A6 = 3.000 \times 10^{-12}$ |

TABLE 8-continued

7 Modified toric surface rz = 20.80
| | | |
|---|---|---|
| K = 0.00 | $A4 = 1.000 \times 10^{-7}$ | $A6 = -4.000 \times 10^{-12}$ |

According to the fifth embodiment, T=0.863, N=1.020 and Λ=0.928, and thus T×N=0.880, Λ/T=1.075, which satisfies the conditions (1) and (2). Therefore, the diffractive surface 62a effectively compensates the power variation due to the uneven distribution of the transmittance of the cover glass plate 14 and the scanning lens 60.

Sixth Embodiment

The scanning optical system according to the sixth embodiment is substantially the same as the fifth embodiment. The arrangement of the elements of the sixth embodiment is also shown in FIG. 3. The blazed wavelength of the diffractive surface 62a, however, is different from the fifth embodiment.

In the sixth embodiment, the blazed wavelength $\lambda_1$ on the optical axis is larger than the actual wavelength $\lambda_0$ in use. Namely, $\lambda_0$ is equal to 780 nm and $\lambda_1$ is equal to 890 nm. The coefficients B0 and B2 are different from the fifth embodiment as shown in TABLE 9, which changes the blazed wavelength. The other values are the same as the fifth embodiment.

TABLE 9

5 Diffractive surface

| | | |
|---|---|---|
| $B0 = -6.00 \times 10^{-2}$ | $B1 = 0.00$ | $B2 = 6.00 \times 10^{-5}$ |

According to the sixth embodiment, T=0.863, N=1.051 and Λ=1.141, and thus T×N=0.907, (Λ×T)$^{-1}$=1.016, which satisfies the conditions (1) and (3). Therefore, the diffractive surface 62a effectively compensates the power variation due to the uneven distribution of the transmittance of the cover glass plate 14 and the scanning lens 60.

Seventh Embodiment

The scanning optical system according to the seventh embodiment is substantially the same as the fifth embodiment. The arrangement of the elements of the seventh embodiment is also shown in FIG. 3.

The diffractive surfaces of the first through sixth embodiments are designed only in consideration of the symmetrical power variation with respect to the optical axis due to the uneven distribution of the transmittance of the elements located between the polygonal mirror 13 and the surface to be scanned 40. Since the uneven distribution of the fθ lens is the main factor of the power variation, the designs of the first through sixth embodiments are sufficient to compensate the power variation. However, if stricter tolerances for the power variation are required, it is desirable to take the variation of reflectance of the polygonal mirror 13 into consideration.

When the light beam from the semiconductor laser 10 is incident on the polygonal mirror 13 from outside of the effective scanning range as shown in FIGS. 1, 2 and 3, the power variation due to the variation of reflectance of the polygonal mirror 13 is asymmetrical with respect to the optical axis, and thus the total power variation is also asymmetrical with respect to the optical axis. Therefore, the variation of the diffraction efficiency of the diffractive surface 62a is asymmetrical with respect to the optical axis, which effectively compensates the asymmetrical power variation.

Further, it is known that the variation of the reflectance varies due to the polarization of the incident light beam on the polygonal mirror 13.

When the light beam from the semiconductor laser 10 is incident on the polygonal mirror 13 as S-polarized light, the diffraction efficiency of the diffractive surface 62a at the same side of the incident beam on the polygonal mirror 13 with respect to the optical axis is set to be higher than that at the other side. On the contrary, when the incident light on the polygonal mirror 13 is P-polarized light, the diffraction efficiency of the diffractive surface 62a at the same side of the incident beam on the polygonal mirror 13 with respect to the optical axis is set to be lower than that at the other side.

In the seventh embodiment, the diffractive surface 62a is designed such that the power variation due to the uneven distribution of the transmittance of the scanning lens 60 and the uneven distribution of the reflectance of the polygonal mirror 13 are compensated, on the precondition that the incident light beam on the polygonal mirror 13 is S-polarized light.

Such a design of the diffractive surface 62a can be obtained by merely changing the coefficients B0, B1 and B2 from the fifth embodiment as shown in TABLE 10. The other values are the same as the fifth embodiment.

In the seventh embodiment, the blazed wavelength $\lambda_1$ on the optical axis is smaller than the actual wavelength $\lambda_0$ in use. Namely, $\lambda_0$ is equal to 780 nm and $\lambda_1$ is equal to 631 nm.

TABLE 10

5 Diffractive surface

B0 = 1.14 × 10$^{-1}$    B1 = 1.00 × 10$^{-3}$    B2 = −5.00 × 10$^{-5}$

According to the seventh embodiment, the transmittance Ty of the scanning lens 60, the reflectance Ry of the polygonal mirror 13 and the diffractive efficiency ηy at each scanning point are shown in TABLE 11. Symbol H-represents a height (distance from the optical axis on the surface to be scanned 40) of the scanning-start point, H0 represents a height of the center of the effective scanning range, and H+ represents a height of the scanning-end point. In the seventh embodiment, the effective light amount calculated by Ty×Ry×ηy becomes constant regardless of the height of the scanning point.

TABLE 11

|  | H− | H0 | H+ |  |
|---|---|---|---|---|
| Ty | 0.614 | 0.711 | 0.614 | (T = 0.863) |
| Ry | 0.804 | 0.839 | 0.871 |  |
| ηy | 1.000 | 0.629 | 0.926 |  |
| Ty×Ry×ηy | 0.494 | 0.495 | 0.495 |  |

Figure 4:
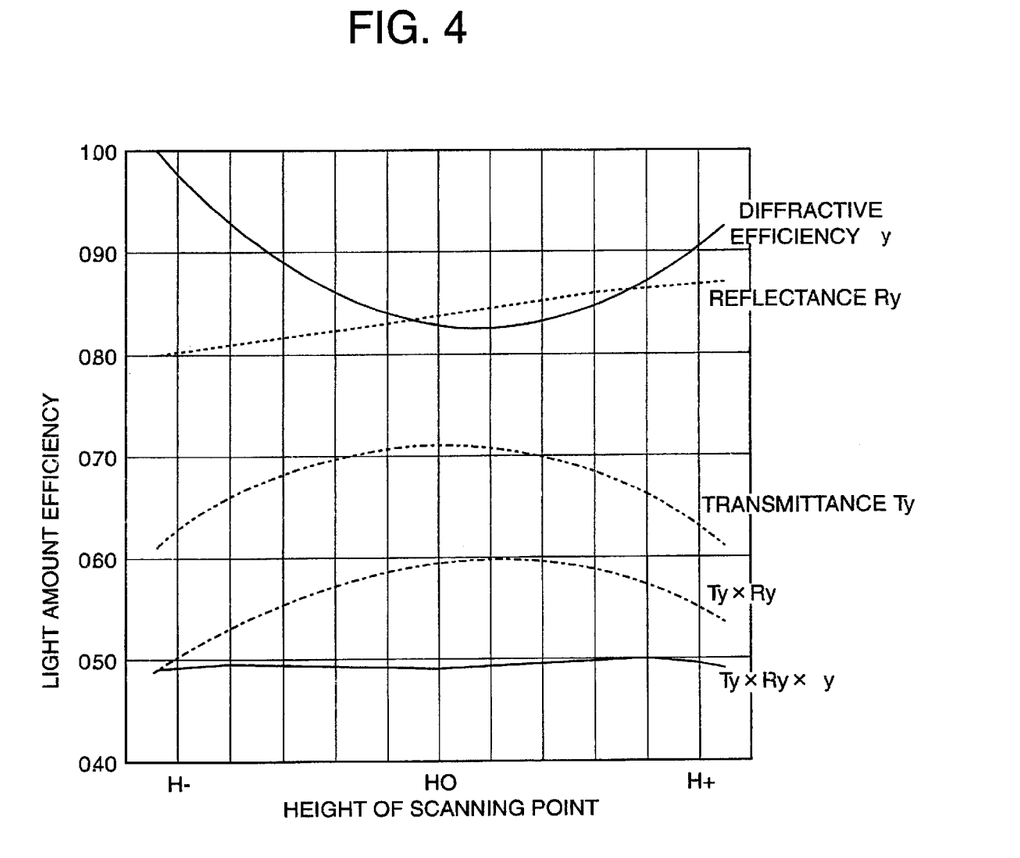
FIG. 4 is a graph showing a relationship between light amount efficiency on a surface to be scanned and height of the position on the surface, according to the seventh embodiment.

FIG. 4 is a graph showing a relationship between light amount efficiency on a surface to be scanned and height of the position on the surface, according to the seventh embodiment. The variation of the transmittance Ty of the scanning lens 60 is symmetrical with respect to the optical axis (H0), while the variation of the reflectance Ry of the polygonal mirror 13 is asymmetrical, i.e., monotonously varying. Therefore, the power variation (Ty×Ry) becomes asymmetrical. Since the variation of the diffractive efficiency ηy is also asymmetrical to compensate for the power variation, the effective light amount (Ty×Ry×ηy) becomes constant.

It should be noted that a multi-beam light source for emitting a plurality of light beams may be employed in place of the single beam semiconductor laser 10 of the embodiments. In such a case, a plurality of light beams form a plurality of scanning lines per scan.

The present disclosure relates to subject matter contained in Japanese Patent Application No. HEI 11-010545, filed on Jan. 19, 1999, which is expressly incorporated herein by reference in its entirety.

What is claimed is:

1. A scanning optical system, comprising:

a light source;

a deflector, which deflects a beam emitted from said light source;

a scanning lens having positive refractive power for converging the beam deflected by said deflector onto a surface to be scanned; and a diffractive surface, which is located between said deflector and said surface to be scanned, for compensating chromatic aberration caused by the refractive power of said scanning lens, the diffraction efficiency of said diffractive surface on an optical axis of said scanning lens being different from that of a peripheral portion to cancel a power variation due to a variation of quantity of light transmitted through said scanning lens.

2. The scanning optical system according to claim 1, wherein said diffractive surface is formed on a plane parallel plate that is independent from said scanning lens, and wherein said plate is located between said deflector and said scanning lens.

3. The scanning optical system according to claim 1, wherein said diffractive surface is formed on one surface of said scanning lens.

4. The scanning optical system according to claim 1, wherein the ratio T of the transmitted light quantities (T=Ty$_1$/Ty$_0$) and the ratio N of the diffractive efficiencies (N=η$_1$/η$_0$) satisfy the following condition (1);

$$0.8 < N \times T < 1.1 \qquad (1)$$

where Ty$_0$ is transmitting light quantity through the optical elements between said deflector and said surface to be scanned along said optical axis, Ty$_1$ is transmitting light quantity through the peripheral portion of said optical elements, η$_0$ is a diffractive efficiency of said diffractive surface on said optical axis, and η$_1$ is a diffractive efficiency of said diffractive surface on the peripheral portion.

5. The scanning optical system according to claim 1, wherein a blazed wavelength of said diffractive surface on said optical axis is different from an actual wavelength in use.

6. The scanning optical system according to claim 5, wherein said blazed wavelength $\lambda_1$ is smaller than said actual wavelength $\lambda_0$, and wherein the ratio Λ of the wavelengths (Λ=$\lambda_1$/$\lambda_0$) and the ratio T of the transmitted light quantities (T=Ty$_1$/Ty$_0$) satisfy the following condition (2);

$$0.8 < \Lambda/T < 1.2 \qquad (2)$$

where Ty$_0$ is transmitting light quantity through the optical elements between said deflector and said surface to be scanned along said optical axis, and Ty$_1$ is transmitting light quantity through the peripheral portion of said optical elements.

7. The scanning optical system according to claim 5, wherein said blazed wavelength $\lambda_1$ is larger than said actual wavelength $\lambda_0$, and wherein the ratio Λ of the wavelengths ($\Lambda=\lambda_1/\lambda_0$) and the ratio T of the transmitted light quantities ($T=Ty_1/Ty_0$) satisfy the following condition (3);

$$0.8 < \Lambda \times T < 1.2 \tag{3}$$

where $Ty_0$ is transmitting light quantity through the optical elements between said deflector and said surface to be scanned along said optical axis, and $Ty_1$ is transmitting light quantity through the peripheral portion of the optical elements between said deflector and said surface to be scanned.

8. The scanning optical system according to claim 1, wherein the light beam traveling to said surface to be scanned is a first order diffractive light diffracted by said diffractive surface.

9. The scanning optical system according to claim 1, wherein said light source is a multi-beam light source for emitting a plurality of light beams, and said plurality of light beams forming a plurality of scanning lines per scan.

10. A scanning optical system, comprising:
   a light source;
   a deflector, which deflects a beam that is emitted from said light source and is incident from outside of an effective scanning range;
   a scanning lens having positive refractive power for converging the beam deflected by said deflector onto a surface to be scanned; and
   a diffractive surface, which is located between said deflector and said surface to be scanned, for compensating chromatic aberration caused by the refractive power of said scanning lens, the diffraction efficiency of said diffractive surface varying along a main scanning direction, and the variation of the diffractive efficiency being asymmetrical with respect to an optical axis of said scanning lens.

11. The scanning optical system according to claim 10, wherein the light beam from said light source is incident on said deflector as S-polarized light, and wherein the diffraction efficiency of said diffractive surface at the same side of the incident beam on said deflector with respect to said optical axis is higher than the diffraction efficiency at the other side.

12. The scanning optical system according to claim 10, wherein the light beam from said light source is incident on said deflector as P-polarized light, and wherein the diffraction efficiency of said diffractive surface at the same side of the incident beam on said deflector with respect to said optical axis is lower than the diffraction efficiency at the other side.

13. The scanning optical system according to claim 10, wherein the light beam traveling to said surface to be scanned is a first order diffractive light diffracted by said diffractive surface.

14. The scanning optical system according to claim 10, wherein said light source is a multi-beam light source for emitting a plurality of light beams, and said plurality of light beams forming a plurality of scanning lines per scan.

* * * * *